US007925106B2

(12) United States Patent
Seo et al.

(10) Patent No.: US 7,925,106 B2
(45) Date of Patent: Apr. 12, 2011

(54) APPARATUS AND METHOD FOR DETECTING MOTION IN CONTINUOUS IMAGES

(75) Inventors: Mi-kyoung Seo, Suwon-si (KR);
Sung-cheol Park, Seongnam-si (KR);
Jae-hong Park, Seongnam-si (KR);
E-woo Chon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 907 days.

(21) Appl. No.: 11/798,837

(22) Filed: May 17, 2007

(65) Prior Publication Data

US 2007/0268412 A1    Nov. 22, 2007

(30) Foreign Application Priority Data

May 18, 2006    (KR) ......................... 10-2006-0044634

(51) Int. Cl.
*G06K 9/46* (2006.01)
(52) U.S. Cl. ........ 382/236; 382/162; 382/167; 382/107; 382/232; 348/702; 375/240.01
(58) Field of Classification Search .................. 382/107, 382/162, 164, 165, 166, 167, 232, 236, 275; 345/555; 358/426.1; 375/240.01, 240.29, 375/240.16; 348/702, 154, 155
See application file for complete search history.

(56) References Cited

U.S. PATENT DOCUMENTS

| 5,418,619 A | * | 5/1995 | Wedam et al. .................. 386/9 |
| 5,657,086 A | * | 8/1997 | Tahara et al. .............. 375/240.13 |
| 5,786,872 A | | 7/1998 | Miyazaki et al. |
| 6,330,344 B1 | * | 12/2001 | Kondo et al. ................. 382/107 |
| 6,766,059 B1 | * | 7/2004 | Kondo ......................... 382/236 |
| 7,133,080 B2 | | 11/2006 | Kobayashi et al. |
| 7,535,515 B2 | | 5/2009 | Bacche et al. |
| 2004/0240551 A1 | * | 12/2004 | Itoh et al. ................. 375/240.16 |
| 2005/0030381 A1 | | 2/2005 | Tanigawa |
| 2005/0134740 A1 | | 6/2005 | Bocche |
| 2008/0013627 A1 | * | 1/2008 | Tahara et al. ............ 375/240.02 |
| 2008/0232464 A1 | * | 9/2008 | Tahara et al. ............ 375/240.02 |
| 2010/0214448 A1 | * | 8/2010 | Ouzilevski et al. ...... 348/231.99 |

FOREIGN PATENT DOCUMENTS

| CN | 1 536 897 A | 10/2004 |
| CN | 1 581 934 A | 2/2005 |
| CN | 1 652 613 A | 8/2005 |
| EP | 0 242 935 | 10/1987 |
| EP | 0 376 330 | 7/1990 |
| KR | 10-2005-0065363 | 6/2005 |

* cited by examiner

*Primary Examiner* — Samir A. Ahmed
*Assistant Examiner* — Ali Bayat
(74) *Attorney, Agent, or Firm* — Lee & Morse, P.C.

(57) ABSTRACT

A motion detection apparatus detecting motion in an image may include a black-and-white signal motion detector, a first color signal motion detector, a second color signal motion detector, and a final motion flag output unit. The motion detection apparatus may output a final motion flag in accordance with whether there is motion in a black-and-white image, whether there is first color motion in a color image, and whether there is second color motion in the color image. The motion detection apparatus may control a threshold value used to determine whether there is motion in an image in the present frame in response to accumulated information about whether there has been motion in the image for a predetermined past frame through to the previous frame.

21 Claims, 8 Drawing Sheets

| F3 | | C1 | C2 | C3 | C4 | C5 | C6 | C7 | C8 | ... |
|---|---|---|---|---|---|---|---|---|---|---|
| | L1 | Ⓨ | Ⓨ | Ⓨ | Y | Y | Y | Y | Y | ... |
| | L2 | Y | Y | Y | Y | Y | Y | Y | Y | ... |
| | L3 | Y | Y | Y | Y | Y | Y | Y | Y | ... |
| | L4 | Y | Y | Y | Y | Y | Y | Y | Y | ... |
| | L5 | Y | Y | Y | Y | Y | Y | Y | Y | ... |
| | : | : | : | : | : | : | : | : | : | : |

D1 + D2 + D3 = Diff_A

| F2 | | C1 | C2 | C3 | C4 | C5 | C6 | C7 | C8 | ... |
|---|---|---|---|---|---|---|---|---|---|---|
| | L1 | Ⓨ | Ⓨ | Ⓨ | Y | Y | Y | Y | Y | ... |
| | L2 | Y | Y | Y | Y | Y | Y | Y | Y | ... |
| | L3 | Y | Y | Y | Y | Y | Y | Y | Y | ... |
| | L4 | Y | Y | Y | Y | Y | Y | Y | Y | ... |
| | L5 | Y | Y | Y | Y | Y | Y | Y | Y | ... |
| | : | : | : | : | : | : | : | : | : | : |

D4 + D5 + D6 = Diff_B

| F1 | | C1 | C2 | C3 | C4 | C5 | C6 | C7 | C8 | ... |
|---|---|---|---|---|---|---|---|---|---|---|
| | L1 | Ⓨ | Ⓨ | Ⓨ | Y | Y | Y | Y | Y | ... |
| | L2 | Y | Y | Y | Y | Y | Y | Y | Y | ... |
| | L3 | Y | Y | Y | Y | Y | Y | Y | Y | ... |
| | L4 | Y | Y | Y | Y | Y | Y | Y | Y | ... |
| | L5 | Y | Y | Y | Y | Y | Y | Y | Y | ... |
| | : | : | : | : | : | : | : | : | : | : |

FIG. 4A

| | | C1 | C2 | C3 | C4 | C5 | C6 | C7 | C8 | ... |
|---|---|---|---|---|---|---|---|---|---|---|
| F3 | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | Y+V | Y-U | Y-V | Y+U | Y+V | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | ⋮ | ⋮ | ⋮ | ⋮ | ⋮ | ⋮ | ⋮ | ⋮ | ⋮ | ⋮ |

| | | C1 | C2 | C3 | C4 | C5 | C6 | C7 | C8 | ... |
|---|---|---|---|---|---|---|---|---|---|---|
| F2 | L1 | Y-U | Y-V | Y+U | Y+V | Y-U | Y-V | Y+U | Y+V | ... |
| | L2 | Y+U | Y+V | Y-U | Y-V | Y+U | Y+V | Y-U | Y-V | ... |
| | L3 | Y-U | Y-V | Y+U | Y+V | Y-U | Y-V | Y+U | Y+V | ... |
| | L4 | Y+U | Y+V | Y-U | Y-V | Y+U | Y+V | Y-U | Y-V | ... |
| | L5 | Y-U | Y-V | Y+U | Y+V | Y-U | Y-V | Y+U | Y+V | ... |
| | ⋮ | ⋮ | ⋮ | ⋮ | ⋮ | ⋮ | ⋮ | ⋮ | ⋮ | ⋮ |

| | | C1 | C2 | C3 | C4 | C5 | C6 | C7 | C8 | ... |
|---|---|---|---|---|---|---|---|---|---|---|
| F1 | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | Y+V | Y-U | Y-V | Y+U | Y+V | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | ⋮ | ⋮ | ⋮ | ⋮ | ⋮ | ⋮ | ⋮ | ⋮ | ⋮ | ⋮ |

FIG. 4B

| F3 | | C1 | C2 | C3 | C4 | C5 | C6 | C7 | C8 | ... |
|---|---|---|---|---|---|---|---|---|---|---|
| | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | Y+V | (Y-U) | Y-V | Y+U | Y+V | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | ⋮ | ⋮ | ⋮ | ⋮ | ⋮ | ⋮ | ⋮ | ⋮ | ⋮ | ⋮ |

Diff_Y23

| F2 | | C1 | C2 | C3 | C4 | C5 | C6 | C7 | C8 | ... |
|---|---|---|---|---|---|---|---|---|---|---|
| | L1 | Y-U | Y-V | Y+U | Y+V | Y-U | Y-V | Y+U | Y+V | ... |
| | L2 | Y+U | Y+V | Y-U | Y-V | Y+U | Y+V | Y-U | Y-V | ... |
| | L3 | Y-U | Y-V | (Y+U) | Y+V | Y-U | Y-V | Y+U | Y+V | ... |
| | L4 | Y+U | Y+V | Y-U | Y-V | Y+U | Y+V | Y-U | Y-V | ... |
| | L5 | Y-U | Y-V | Y+U | Y+V | Y-U | Y-V | Y+U | Y+V | ... |
| | ⋮ | ⋮ | ⋮ | ⋮ | ⋮ | ⋮ | ⋮ | ⋮ | ⋮ | ⋮ |

Diff_Y21

| F1 | | C1 | C2 | C3 | C4 | C5 | C6 | C7 | C8 | ... |
|---|---|---|---|---|---|---|---|---|---|---|
| | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | Y+V | (Y-U) | Y-V | Y+U | Y+V | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | ⋮ | ⋮ | ⋮ | ⋮ | ⋮ | ⋮ | ⋮ | ⋮ | ⋮ | ⋮ |

FIG. 5

| F3 | | C1 | C2 | C3 | C4 | C5 | C6 | C7 | C8 | ... |
|---|---|---|---|---|---|---|---|---|---|---|
| | L1 | Y+U | Y+V | Y−U | Y−V | Y+U | Y+V | Y−U | Y−V | ... |
| | L2 | Y−U | Y−V | Y+U | Y+V | Y−U | Y−V | Y+U | Y+V | ... |
| | L3 | (Y+U) | Y+V | (Y−U) | Y−V | (Y+U) | Y+V | Y−U | Y−V | ... |
| | L4 | Y−U | Y−V | Y+U | Y+V | Y−U | Y−V | Y+U | Y+V | ... |
| | L5 | Y+U | Y+V | Y−U | Y−V | Y+U | Y+V | Y−U | Y−V | ... |
| | ⋮ | ⋮ | ⋮ | ⋮ | ⋮ | ⋮ | ⋮ | ⋮ | ⋮ | |

D7 + D8 + D9 = Diff_U

| F2 | | C1 | C2 | C3 | C4 | C5 | C6 | C7 | C8 | ... |
|---|---|---|---|---|---|---|---|---|---|---|
| | L1 | Y−U | Y−V | Y+U | Y+V | Y−U | Y−V | Y+U | Y+V | ... |
| | L2 | Y+U | Y+V | Y−U | Y−V | Y+U | Y+V | Y−U | Y−V | ... |
| | L3 | Y−U | Y−V | Y+U | Y+V | Y−U | Y−V | Y+U | Y+V | ... |
| | L4 | Y+U | Y+V | Y−U | Y−V | Y+U | Y+V | Y−U | Y−V | ... |
| | L5 | Y−U | Y−V | Y+U | Y+V | Y−U | Y−V | Y+U | Y+V | ... |
| | ⋮ | ⋮ | ⋮ | ⋮ | ⋮ | ⋮ | ⋮ | ⋮ | ⋮ | |

| F1 | | C1 | C2 | C3 | C4 | C5 | C6 | C7 | C8 | ... |
|---|---|---|---|---|---|---|---|---|---|---|
| | L1 | Y+U | Y+V | Y−U | Y−V | Y+U | Y+V | Y−U | Y−V | ... |
| | L2 | Y−U | Y−V | Y+U | Y+V | Y−U | Y−V | Y+U | Y+V | ... |
| | L3 | (Y+U) | Y+V | (Y−U) | Y−V | (Y+U) | Y+V | Y−U | Y−V | ... |
| | L4 | Y−U | Y−V | Y+U | Y+V | Y−U | Y−V | Y+U | Y+V | ... |
| | L5 | Y+U | Y+V | Y−U | Y−V | Y+U | Y+V | Y−U | Y−V | ... |
| | ⋮ | ⋮ | ⋮ | ⋮ | ⋮ | ⋮ | ⋮ | ⋮ | ⋮ | |

FIG. 6

| F3 | | C1 | C2 | C3 | C4 | C5 | C6 | C7 | C8 | ... |
|---|---|---|---|---|---|---|---|---|---|---|
| | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | (Y+V) | Y-U | (Y-V) | Y+U | (Y+V) | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | : | : | : | : | : | : | : | : | : | |

D10  +  D11  +  D12  =  Diff_V

| F2 | | C1 | C2 | C3 | C4 | C5 | C6 | C7 | C8 | ... |
|---|---|---|---|---|---|---|---|---|---|---|
| | L1 | Y-U | Y-V | Y+U | Y+V | Y-U | Y-V | Y+U | Y+V | ... |
| | L2 | Y+U | Y+V | Y-U | Y-V | Y+U | Y+V | Y-U | Y-V | ... |
| | L3 | Y-U | Y-V | Y+U | Y+V | Y-U | Y-V | Y+U | Y+V | ... |
| | L4 | Y+U | Y+V | Y-U | Y-V | Y+U | Y+V | Y-U | Y-V | ... |
| | L5 | Y-U | Y-V | Y+U | Y+V | Y-U | Y-V | Y+U | Y+V | ... |
| | : | : | : | : | : | : | : | : | : | |

| F1 | | C1 | C2 | C3 | C4 | C5 | C6 | C7 | C8 | ... |
|---|---|---|---|---|---|---|---|---|---|---|
| | L1 | Y+U | Y+V | Y-U | Y-V | Y+U | Y+V | Y-U | Y-V | ... |
| | L2 | Y-U | Y-V | Y+U | Y+V | Y-U | Y-V | Y+U | Y+V | ... |
| | L3 | Y+U | (Y+V) | Y-U | (Y-V) | Y+U | (Y+V) | Y-U | Y-V | ... |
| | L4 | Y-U | Y-V | Y+U | Y+V | Y-U | Y-V | Y+U | Y+V | ... |
| | L5 | Y+U | Y+V | Y-U | Y-V | Y+U | Y+V | Y-U | Y-V | ... |
| | : | : | : | : | : | : | : | : | : | |

APPARATUS AND METHOD FOR DETECTING MOTION IN CONTINUOUS IMAGES

BACKGROUND OF THE INVENTION

1. Field of the Invention

The present invention relates to a motion detection apparatus and method, for providing information about whether there is motion in an image to a device for separating a luminance signal and a chrominance signal from a composite video signal. More particularly, the present invention relates to a motion detection apparatus and method for accumulating information about whether there has been motion in images from a past frame to the previous frame, and using the accumulated information as a threshold value when determining whether there is motion in an image of the present frame, in consideration of whether there is motion in a black-and-white image and whether there is color motion in a color image.

2. Description of the Related Art

A video signal generated by a photographing device may be subjected to a signal processing operation, e.g., modulation, and then transmitted to a display device through a wired or wireless channel. The display device may restore the received signal through a signal processing operation, e.g., demodulation, and display an image corresponding to the restored signal on a screen.

An RGB signal generated by the photographing device may be transformed into a luminance signal (Y signal) and a chrominance signal (C signal) by a transformer, according to the type of the signal transmission system (for example, a National Television System Committee (NTSC) system or a Phase Alternation by Line (PAL) system). The C signal may be divided into U and V signals or I and Q signals according to the type of the signal transmission system.

To transmit the video signal through the channel, the Y and C signals may be synthesized to produce a composite video signal. The composite video signal may include a plurality of frame signals. A single frame signal may include data (referred to as "one frame image data" hereinafter) about an image (one frame image) displayed on a screen for a unit of time (that is, one frame). The one frame image data may be composed of a plurality of line data units each including a plurality of column data units. One line and one column may define one pixel. When the one frame image data is composed of X*Y pixel data, for example, the one frame image data includes X line data units each including Y column data units.

To separate Y and C signals corresponding to a certain pixel from the composite video signal, pixel data adjacent the certain pixel in time or location may be used. When there is no motion in an image, using temporally adjacent pixel data may provide the most accurate separation. When there is motion, using temporally adjacent pixel data may result in a large error, so spatially adjacent pixel data may be used instead. Therefore, motion detection may be used to select an appropriate separation.

However, conventional motion detection only detects whether there is motion in an image based on the amplitude of the composite video signal (for example, the sum of the amplitudes of Y, U and V signals), without considering the individual components of the composite video signal (for example, the individual Y, U and V signals). As a result, no motion in an image may be detected even when the respective amplitudes of the Y, U and V signals vary, but the sum of the amplitudes of the Y, U and V signals does not vary. Thus, temporally adjacent pixel data may be inappropriately used to separate Y and C signals from the composite video signal, which may result a large error.

SUMMARY OF THE INVENTION

The present invention is therefore directed to an apparatus and method for detecting motion in a continuous image, which substantially overcome one or more of the problems due to the limitations and disadvantages of the related art.

It is therefore a feature of an embodiment of the present invention to provide a motion detection apparatus and method for determining whether there is motion in an image in consideration of whether there is motion in a black-and-white image and whether there is motion in a color image.

It is therefore another feature of an embodiment of the present invention to provide a motion detection apparatus and method for accumulating information about whether there has been motion in images of a predetermined past frame through to the previous frame and using the information as a threshold value when determining whether there is motion in the image corresponding to the present frame.

At least one of the above and other features and advantages of the present invention may be realized by providing a motion detection apparatus detecting motion in an image, the motion detection apparatus including a black-and-white signal motion detector adapted to receive a first frame signal indicating a previous frame, a second frame signal indicating a present frame, a third frame signal indicating a next frame, and a black-and-white motion threshold value, to determine whether there is motion in a black-and-white image, and to output a black-and-white motion flag, a first color signal motion detector adapted to receive the first frame signal, the second frame signal, the third frame signal and a first color motion threshold value, to determine whether there is first color motion in a color image, and to output a first color motion flag, a second color signal motion detector adapted to receive the first frame signal, the third frame signal, and a second color motion threshold value, to determine whether there is second color motion in the color image, and to output a second color motion flag, and a final motion flag output unit adapted to receive the black-and-white motion flag, the first color motion flag, and the second color motion flag, and to output a final motion flag.

The final motion flag output unit may output the final motion flag indicating that there is no motion in an image when the black-and-white motion flag indicates that there is no motion in the black-and-white image, or when the first color motion flag indicates that there is no first color motion in the color image and the second color motion flag indicates that there is no second color motion in the color image.

The motion detection apparatus may include a threshold value controller adapted to receive the black-and-white motion flag, the first color motion flag, and the second color motion flag, and to control the black-and-white motion threshold value, the first color motion threshold value, and the second color motion threshold value. The threshold value controller may accumulate the values of the black-and-white motion flag, the first color motion flag, and the second color motion flag input to the threshold value controller for a predetermined past frame through to the previous frame, and controls the black-and-white motion threshold value, the first color motion threshold value, and the second color motion threshold value of the present frame in response to the accumulated values.

When a logic low flag is to indicate there is no motion, the smaller the accumulated values are, the larger the threshold value controller sets the black-and-white motion threshold value, the first color motion threshold value, and the second color motion threshold value. When a logic high flag is to indicate there is no motion, the larger the accumulated values are, the larger the threshold value controller sets the black-and-white motion threshold value, the first color motion threshold value, and the second color motion threshold value.

The black-and-white motion signal detector may include a first subtracter adapted to calculate an absolute value of a difference between the second frame signal and the third frame signal, a second subtracter adapted to calculate an absolute value of a difference between the second frame signal and the first frame signal, a first accumulator adapted to accumulate the absolute value of the difference between the second frame signal and the third frame signal for a predetermined unit of data, a second accumulator adapted to accumulate the absolute value of the difference between the second frame signal and the first frame signal for a predetermined unit of data, and a comparator adapted to output the black-and-white motion flag indicating that there is no motion in the black-and-white image when a first difference accumulation value output from the first accumulator is smaller than the black-and-white motion threshold value and a second difference accumulation value output from the second accumulator is smaller than the black-and-white motion threshold value.

The first color signal motion detector may include a low pass filter adapted to low-pass-filter the first frame signal, the second frame signal and the third frame signal, and to output a first frame first color component signal, a second frame first color component signal and a third frame first color component signal, a first subtracter adapted to calculate a difference between the second frame first color component signal and the third frame first color component signal, a second subtracter adapted to calculate a difference between the second frame first color component signal and the first frame first color component signal, and a comparator adapted to output the first color motion flag indicating that there is no first color motion in the color image when a first first color difference value output from the first subtracter is smaller than the first color motion threshold value and a second first color difference value output from the second subtracter is smaller than the first color motion threshold value.

The second color signal motion detector may include a subtracter adapted to calculate an absolute value of the difference between the third frame signal and the first frame signal, an accumulator adapted to accumulate an absolute value of the difference between the third frame signal and the first frame signal for a predetermined unit of data, and a comparator adapted to output the second color motion flag indicating that there is no second color motion in the color image when a second color difference value output from the accumulator is smaller than the second color motion threshold value.

The motion detection apparatus may include a third color signal motion detector adapted to receive the first frame signal, the third frame signal, and a third color motion threshold value, to determine whether there is third color motion in the color image, and to output a third color motion flag.

At least one of the above and other features and advantages of the present invention may be realized by providing a motion detection method for determining motion in an image, the method including receiving a first frame signal, a second frame signal and a third frame signal, and determining whether there is motion in a black-and-white image, receiving the first frame signal, the second frame signal and the third frame signal, and determining whether there is first color motion in a color image, receiving the first frame signal and the third frame signal, and determining whether there is second color motion in the color image, and outputting a final motion flag in accordance with the black-and-white motion determination, the first color motion determination and the second color motion determination.

Outputting the final motion flag may include outputting the final motion flag indicating that there is no motion in the image when it is determined that there is no motion in the black-and-white image, or when it is determined that there is no first color motion in the color image and that there is no second color motion in the color image.

The method may include controlling a black-and-white motion threshold value for determining whether there is motion in the black-and-white image, a first color motion threshold value for determining whether there is first color motion in the color image, and a second color motion threshold value for determining whether there is second color motion in the color image.

The method may include accumulating an first absolute value of a difference between the second frame signal and the third frame signal for a predetermined unit of data, accumulating a second absolute value of a difference between the second frame signal and the first frame signal for a predetermined unit of data, determining that there is no motion in the black-and-white image when the accumulated first second absolute value and the accumulated second absolute value are smaller than the black-and-white motion threshold value.

The method may include low-pass-filtering the first frame signal, the second frame signal and the third frame signal to obtain a first frame first color component signal, a second frame first color component signal and a third frame first color component signal, and determining that there is no first color motion in the color image when the difference between the second frame first color component signal and the third frame first color component signal is smaller than the first color motion threshold value, and the difference between the second frame first color component signal and the first frame first color component signal is smaller than the first color motion threshold value.

The method may include accumulating an absolute value of a difference between the third frame signal and the first frame signal for a predetermined unit of data, and determining that there is no second color motion in the color image when the absolute value is smaller than the second color motion threshold value.

The black-and-white motion threshold value of the present frame may be set in accordance with whether there has been motion in the black-and-white image in a predetermined past frame through to the previous frame. The first color motion threshold value of the present frame may be set in accordance with whether there has been first color motion in the color image in a predetermined past frame through to the previous frame. The second color motion threshold value of the present frame may be set in accordance with whether there has been second color motion in the color image in a predetermined past frame through to the previous frame.

The method may include receiving the first frame signal and the third frame signal, and determining whether there is third color motion in the color image.

At least one of the above and other features and advantages of the present invention may be realized by providing an article of manufacture having a machine-accessible medium including data that, when accessed by a machine, cause the machine to perform a method of determining motion in an image according to any of the above methods.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

The present invention will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 1:
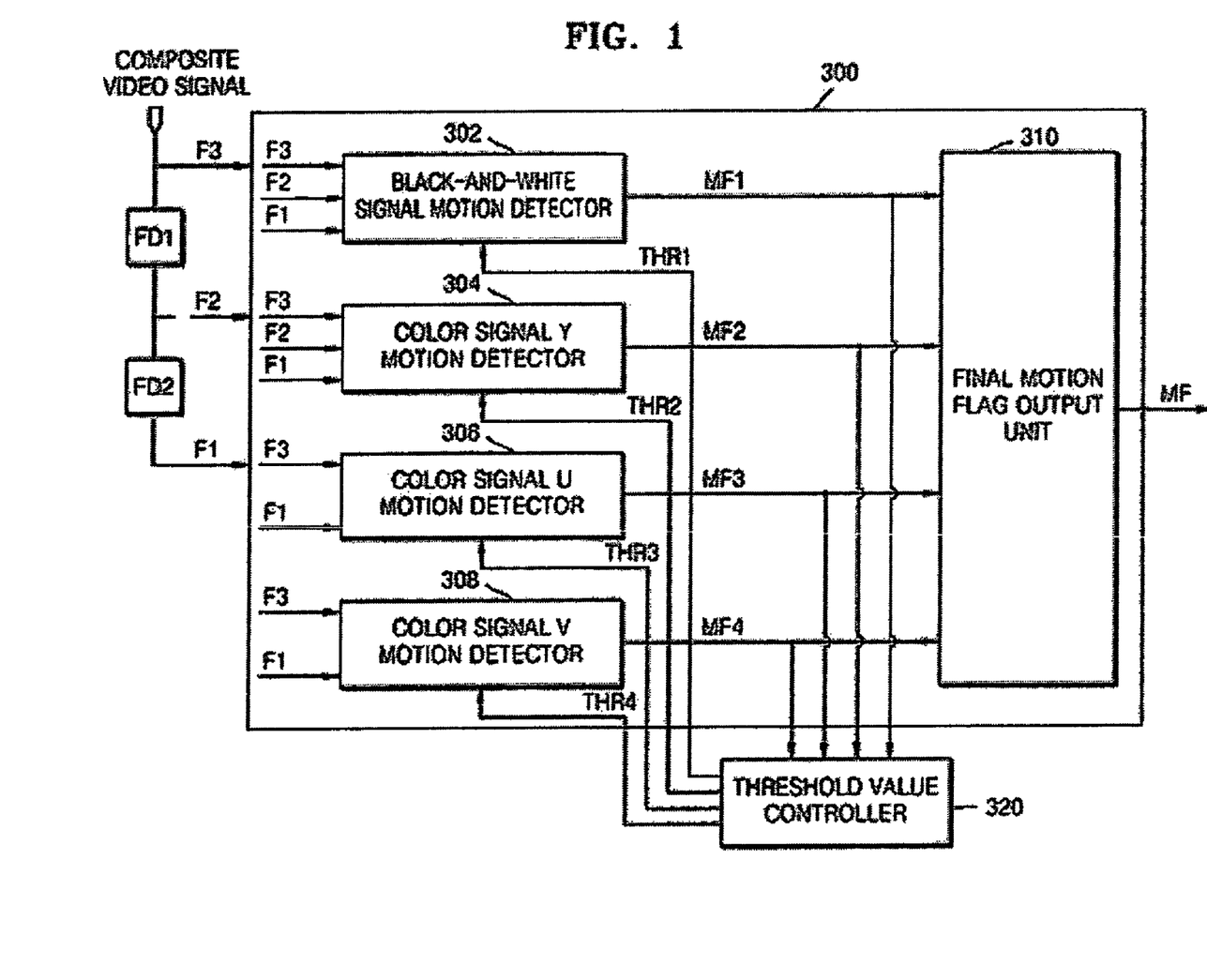
FIG. 1 illustrates a block diagram of a motion detection apparatus according to an embodiment of the present invention.

FIG. 1 illustrates a block diagram of a motion detection apparatus according to an embodiment of the present invention. Referring to FIG. 1, the motion detection apparatus may include a first frame delay FD1, a second frame delay FD2, a motion detector 300 and a threshold value controller 320. The motion detector 300 may include a black-and-white signal motion detector 302, a color signal Y motion detector 304, a color signal U motion detector 306, a color signal V motion detector 308, and a final motion flag output unit 310.

In FIG. 1, a second frame signal F2 indicates the present frame, a first frame signal F1 indicates the previous frame, and a third frame signal F3 indicates the next frame. The first frame delay FD1 and the second frame delay FD2 may delay an input frame signal by one frame. A composite video signal, e.g., a composite video blanking synchronization (CVBS) signal, may include a plurality of frame signals.

The black-and-white motion detector 302 may receive the first frame signal F1, the second frame signal F2, the third frame signal F3, and a black-and-white motion threshold value THR1, and may determine whether there is motion in a black-and-white image. The black-and-white motion detector 302 may output a black-and-white motion flag MF1 in accordance with the determination result to the final motion flag output unit 310. When a variation in the amplitude of a black-and-white signal corresponding to an arbitrary pixel in continuous frames is greater than the black-and-white motion threshold value THR1, there is considered to be motion in the black-and-white image. The operation of the black-and-white signal motion detector 302 will be explained later with reference to FIGS. 2A and 3.

The color signal Y motion detector 304 may receive the first frame signal F1, the second frame signal F2, the third frame signal F3, and a Y motion threshold value THR2, and may determine whether there is Y motion in a color image. The color signal Y motion detector 304 may output a Y motion flag MF2 in accordance with the determination result to the final motion flag output unit 310. When a variation in the amplitude of a Y signal (a Y component signal of the composite video signal input to the motion detecting apparatus) corresponding to an arbitrary pixel in continuous frames is greater than the Y motion threshold value THR2, there is considered to be Y motion in the color image. The operation of the color signal Y motion detector 304 will be explained later with reference to FIGS. 2B, 4A and 4B.

The color signal U motion detector 306 may receive the first frame signal F1, the third frame signal F3, and a U motion threshold value THR3, and may determine whether there is U motion in the color image. The color signal U motion detector 306 may output a U motion flag MF3 in accordance with the determination result to the final motion flag output unit 310. When a variation in the amplitude of a U signal (a U component signal of the composite video signal) corresponding to an arbitrary pixel in continuous frames is greater than the U motion threshold value THR3, there is considered to be U motion in the color image. The operation of the color signal U motion detector 306 will be explained later with reference to FIGS. 2C and 5.

The color signal V motion detector 308 may receive the first frame signal F1, the third frame signal F3, and a V motion threshold value THR4, and may determine whether there is V motion in the color image. The color signal V motion detector 308 may output a V motion flag MF4 in accordance with the determination result to the final motion flag output unit 310. When a variation in the amplitude of a V signal (a V component signal of the composite video signal) corresponding to an arbitrary pixel in continuous frames is greater than the V motion threshold value THR4, there is considered to be V motion in the color image. The operation of the color signal V motion detector 308 will be explained later with reference to FIGS. 2D and 6.

The final motion flag output unit 310 may receive the black-and-white motion flag MF1, the Y motion flag MF2, the U motion flag MF3 and the V motion flag MF4, and may output a final motion flag MF. The final motion flag MF output from the final motion flag output unit 310 may be input to a signal separator that separates a luminance signal and a chrominance signal from the composite video signal, i.e., may be used to determine how the composite video signal is to be separated.

The final motion flag output unit 310 may output the final motion flag MF indicating that there is no motion in an image when the black-and-white motion flag MF1 indicates that there is no motion in the black-and-white image. Furthermore, the final motion flag output unit 310 may output the final motion flag MF indicating that there is no motion in an image when the Y motion flag MF2, the U motion flag MF3 and the V motion flag MF4 indicate that there is no motion in the color image. For this operation, the final motion flag output unit 310 may include components as illustrated in FIG. 2E, which illustrates a configuration of the final motion flag output unit 310 of FIG. 1 according to an embodiment of the present invention.

Figure 2A:
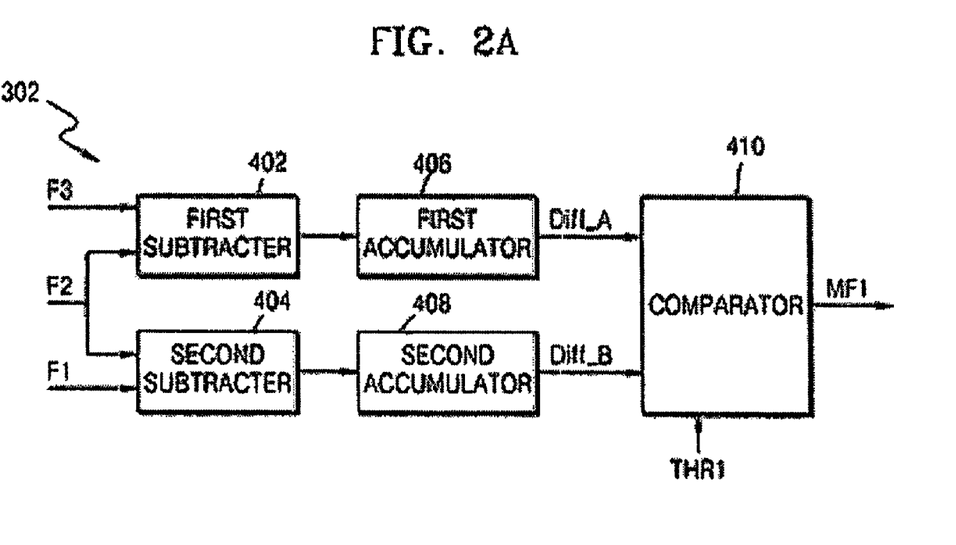
FIG. 2A illustrates a block diagram of the black-and-white signal motion detector of FIG. 1 according to an embodiment of the present invention.
Figure 2B:
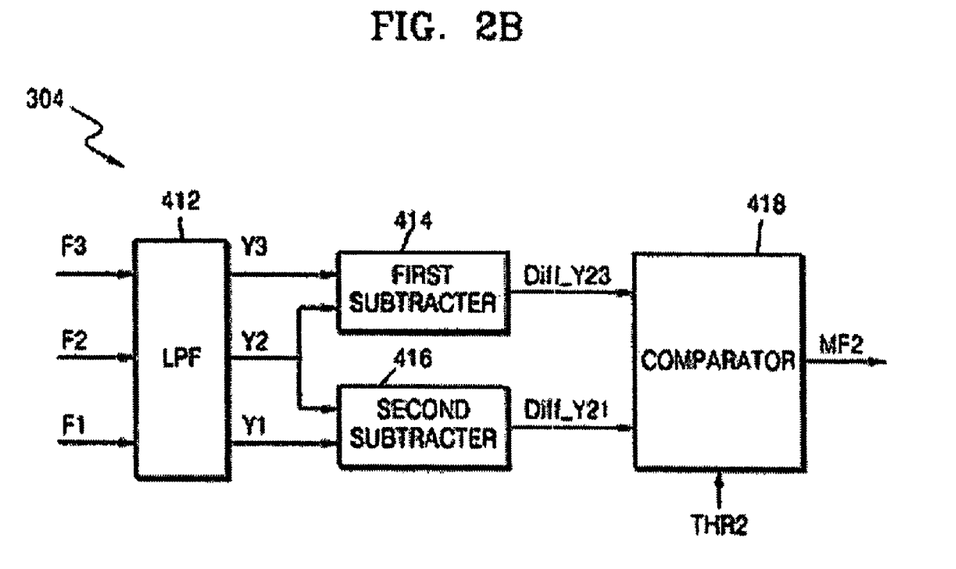
FIG. 2B illustrates a block diagram of the color signal Y motion detector of FIG. 1 according to an embodiment of the present invention.
Figure 2C:
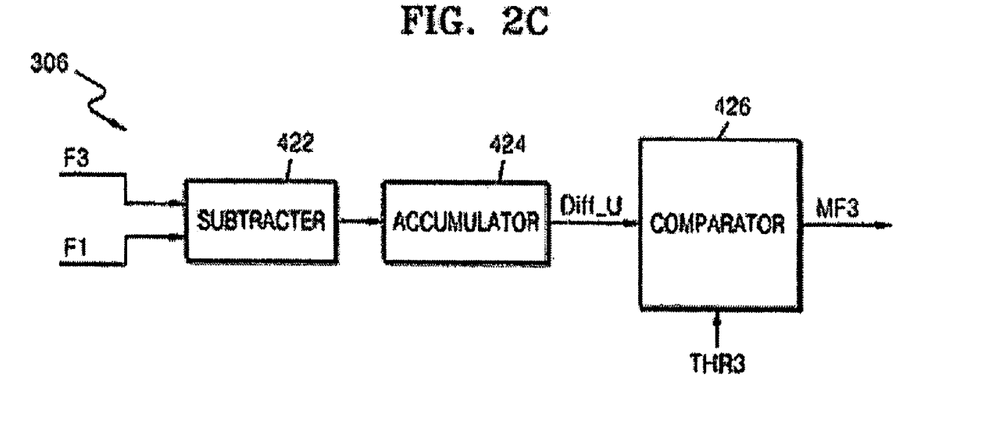
FIG. 2C illustrates a block diagram of the color signal U motion detector of FIG. 1 according to an embodiment of the present invention.
Figure 2D:
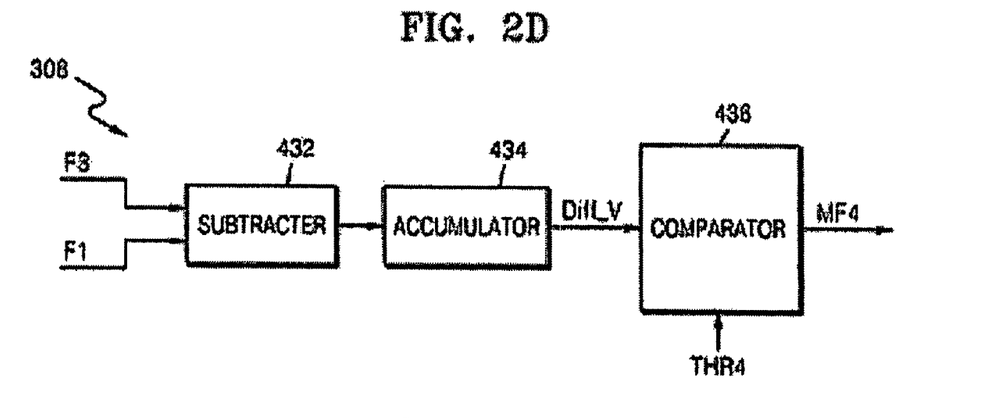
FIG. 2D illustrates a block diagram of the color signal V motion detector of FIG. 1 according to an embodiment of the present invention.
Figure 2E:
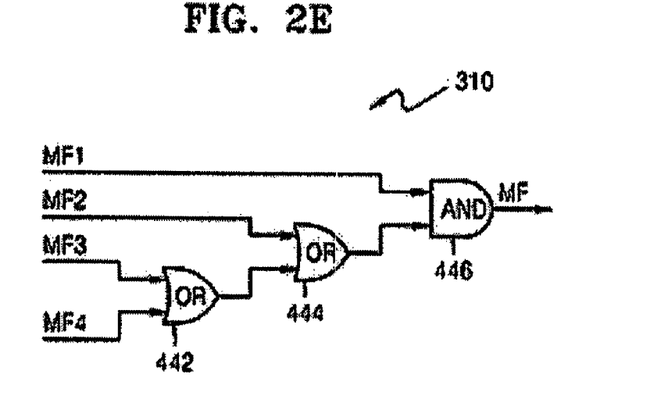
FIG. 2E illustrates the configuration of the final motion flag output unit of FIG. 1 according to an embodiment of the present invention.

Referring to FIG. 2E, the final motion flag output unit 310 may include OR gates 442 and 444 receiving the Y motion flag MF2, the U motion flag MF3 and the V motion flag MF4, and an AND gate 446 receiving the output signal of the OR gate 444 and the black-and-white motion flag MF1. The final motion flag output unit 310 may output the final motion flag MF at a logic low level, which indicates that there is no motion in an image, when the black-and-white motion flag MF1 is at a logic low level or the Y motion flag MF2, the U motion flag MF3 and the V motion flag MF4 are all at a logic low level.

Alternatively, the final motion flag output unit 310 may include an AND gate (not shown) receiving the Y motion flag MF2, the U motion flag MF3 and the V motion flag MF4, and an OR gate (not shown) receiving the output signal of the AND gate and the black-and-white motion flag MF1. In this case, the final motion flag output unit 310 may output the final motion flag MF at a logic high level, which indicates that there is no motion in an image when the black-and-white motion flag MF1 is at a logic high level or the Y motion flag MF2, the U motion flag MF3 and the V motion flag MF4 are all at a logic high level.

Referring again to FIG. 1, the threshold value controller 320 may receive the black-and-white motion flag MF1, the Y motion flag MF2, the U motion flag MF3 and the V motion flag MF4, and may control the black-and-white motion threshold value THR1, the Y motion threshold value THR2, the U motion threshold value THR3 and the V motion threshold value THR4. For example, the threshold value controller 320 may accumulate the black-and-white motion flag MF1, the Y motion flag MF2, the U motion flag MF3 and the V motion flag MF4 input to the threshold value controller 320 for a predetermined past frame through to the previous frame, and may control the black-and-white motion threshold value THR1, the Y motion threshold value THR2, the U motion threshold value THR3 and the V motion threshold value THR4 in the present frame.

When a low-level flag value is to indicate that there is no motion in an image, and when the value accumulated in the threshold value controller 320 for the predetermined past frame through to the previous frame is small, there is considered to be little motion in images of the predetermined past frame through to the previous frame. Accordingly, no motion is expected in the image of present frame. In this case, the threshold value controller 320 may increase the threshold values THR1, THR2, THR3 and THR4.

Alternatively, when a high-level flag value is to indicate that there is no motion in an image, and when the value accumulated in the threshold value controller 320 for the predetermined past frame through to the previous frame is large, there is considered to be little motion in images of the predetermined past frame through to the previous frame. Accordingly, no motion is expected in the image of the present frame. In this case, the threshold value controller 320 may increase the threshold values THR1, THR2, THR3 and THR4.

The operations of the black-and-white signal motion detector 302, the color signal Y motion detector 304, the color signal U motion detector 306 and the color signal V motion detector 308, illustrated in FIG. 1, will now be explained with reference to FIGS. 2A through 6.

FIGS. 3 through 6 illustrate three frames' image data. In FIGS. 3 through 6, F1 denotes a frame signal indicating the previous frame, F2 denotes a frame signal indicating the present frame, and F3 denotes a frame signal indicating the next frame. One frame signal may include a plurality of line data units L1, L2, L3, L4, L5, . . . . One line data unit may include a plurality of column data units C1, C2, C3, C4, C5, C6, C7, C8, . . . . One line and one column may define one pixel.

When the composite video signal input to the motion detection apparatus illustrated in FIG. 1 is a CVBS signal, the signal may be represented as follows.

$$CVBS(t)=Y(t)+U(t)*\cos(fsc*t)+V(t)*\sin(fsc*t)$$

Here, fsc denotes a sub-carrier frequency. The CVBS signal CVBS(t) is composed of a luminance signal Y(t), a first chrominance signal U(t) and a second chrominance signal V(t).

When the CVBS signal is sampled at a frequency of four times the sub-carrier frequency fsc, pixel data as illustrated in FIGS. 3 through 6 may be obtained. Here, the pixel data corresponds to the amplitude of the sampled CVBS signal.

Figure 3:
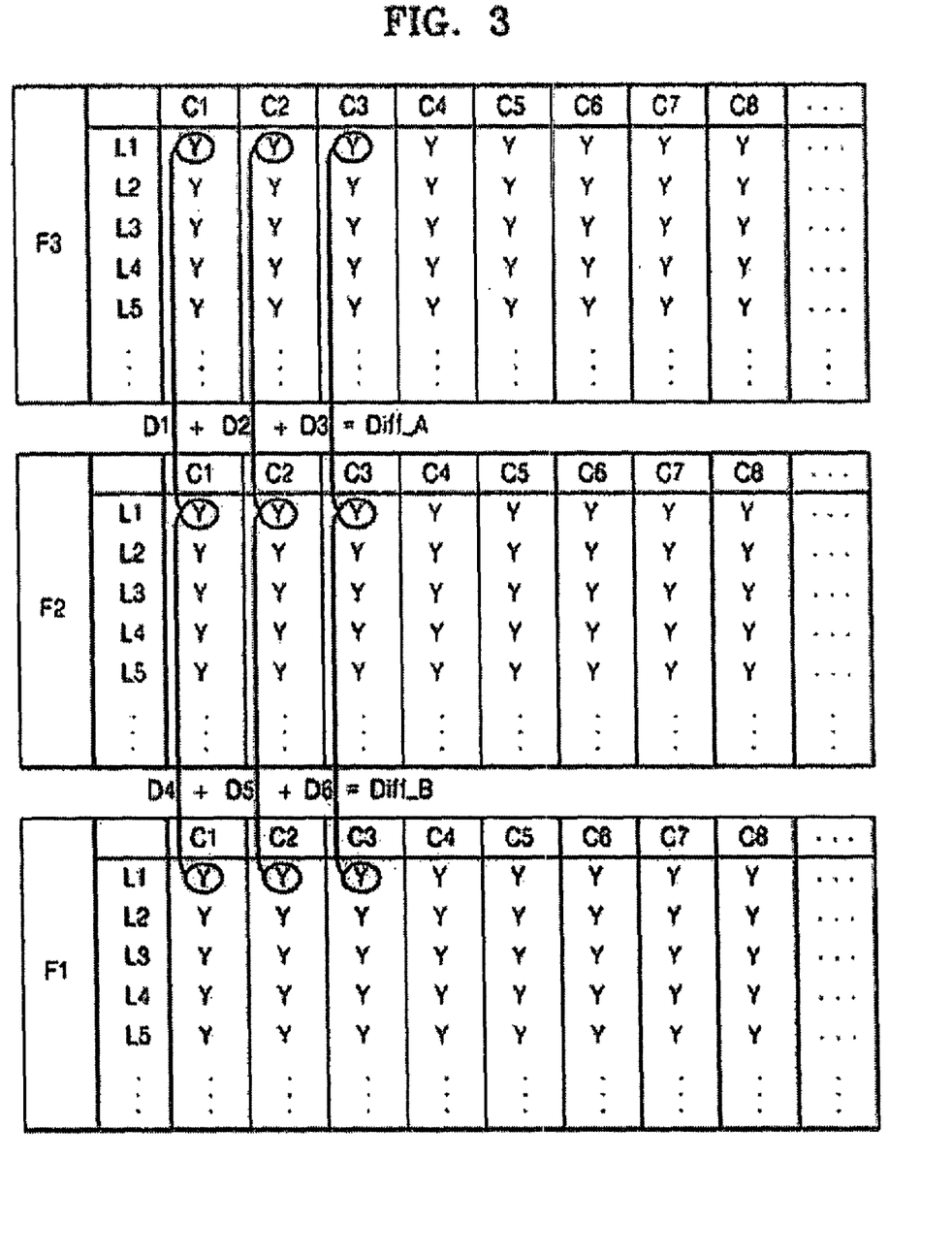
FIG. 3 illustrates a diagram for explaining the operation of the black-and-white signal motion detector of FIG. 2A.

When the composite video signal is a black-and-white signal corresponding to a black-and-white image, the pixel data may be represented by only the amplitude of the luminance signal (Y in FIG. 3), as illustrated in FIG. 3. When the composite video signal is a color signal corresponding to a color image, pixel data may be represented by Y±U or Y±V, as illustrated in FIGS. 4A through 6. Here, Y, U and V respectively represent the amplitudes of Y signal, U signal and V signal.

FIG. 2A illustrates a block diagram of the black-and-white signal motion detector 302 of FIG. 1 according to an embodiment of the present invention, and FIG. 3 illustrates a diagram for explaining the operation of the black-and-white signal motion detector 302 of FIG. 2A.

Referring to FIGS. 2A and 3, the black-and-white signal motion detector 302 may include a first subtracter 402, which calculates the absolute value of the difference between the second frame signal F2 and the third frame signal F3, a second subtracter 404, which calculates the absolute value of the difference between the second frame signal F2 and the first frame signal F1, a first accumulator 406, which accumulates the absolute value of the difference between the second frame signal F2 and the third frame signal F3, a second accumulator 408, which accumulates the absolute value of the difference between the second frame signal F2 and the first frame signal F1, and a comparator 410. The first and second accumulators 406 and 408 may respectively accumulate the absolute values corresponding to three columns in FIG. 3.

Specifically, the first subtracter 402 may calculate an absolute value D1 of the difference between pixel data F2/L1/C1 (pixel data corresponding to the first column of the first line in the second frame) and pixel data F3/L1/C1 (pixel data corresponding to the first column of the first line of the third frame), an absolute value D2 of the difference between pixel data F2/L1/C2 (pixel data corresponding to the second column of the first line of the second frame) and pixel data F3/L1/C2 (pixel data corresponding to the second column of the first line of the third frame), and an absolute value D3 of the difference between pixel data F2/L1/C3 (pixel data corresponding to the third column of the first line of the second frame) and pixel data F3/L1/C3 (pixel data corresponding to the third column of the first line of the third frame). The first accumulator 406 may accumulate the absolute values D1, D2 and D3, and may output a first difference accumulation value Diff_A.

The second subtracter 404 may calculate an absolute value D4 of the difference between pixel data F2/L1/C1 and pixel data F1/L1/C1, an absolute value D5 of the difference between pixel data F2/L1/C2 and pixel data F1/L1/C2, and an absolute value D6 of the difference between pixel data F2/L1/C3 and pixel data F1/L1/C3. The second accumulator 408 may accumulate the absolute values D4, D5 and D6, and may output a second difference accumulation value Diff_B.

The comparator 410 may output the black-and-white motion flag MF1 indicating that there is no motion in the black-and-white image when the first difference accumulation value Diff_A output from the first accumulator 406 is smaller than the black-and-white motion threshold value THR1 and the second difference accumulation value Diff_B output from the second accumulator 408 is smaller than the black-and-white motion threshold value THR1, and otherwise may output the black-and-white motion flag MF1 indicating that there is motion in the black-and-white image.

Figure 4A:
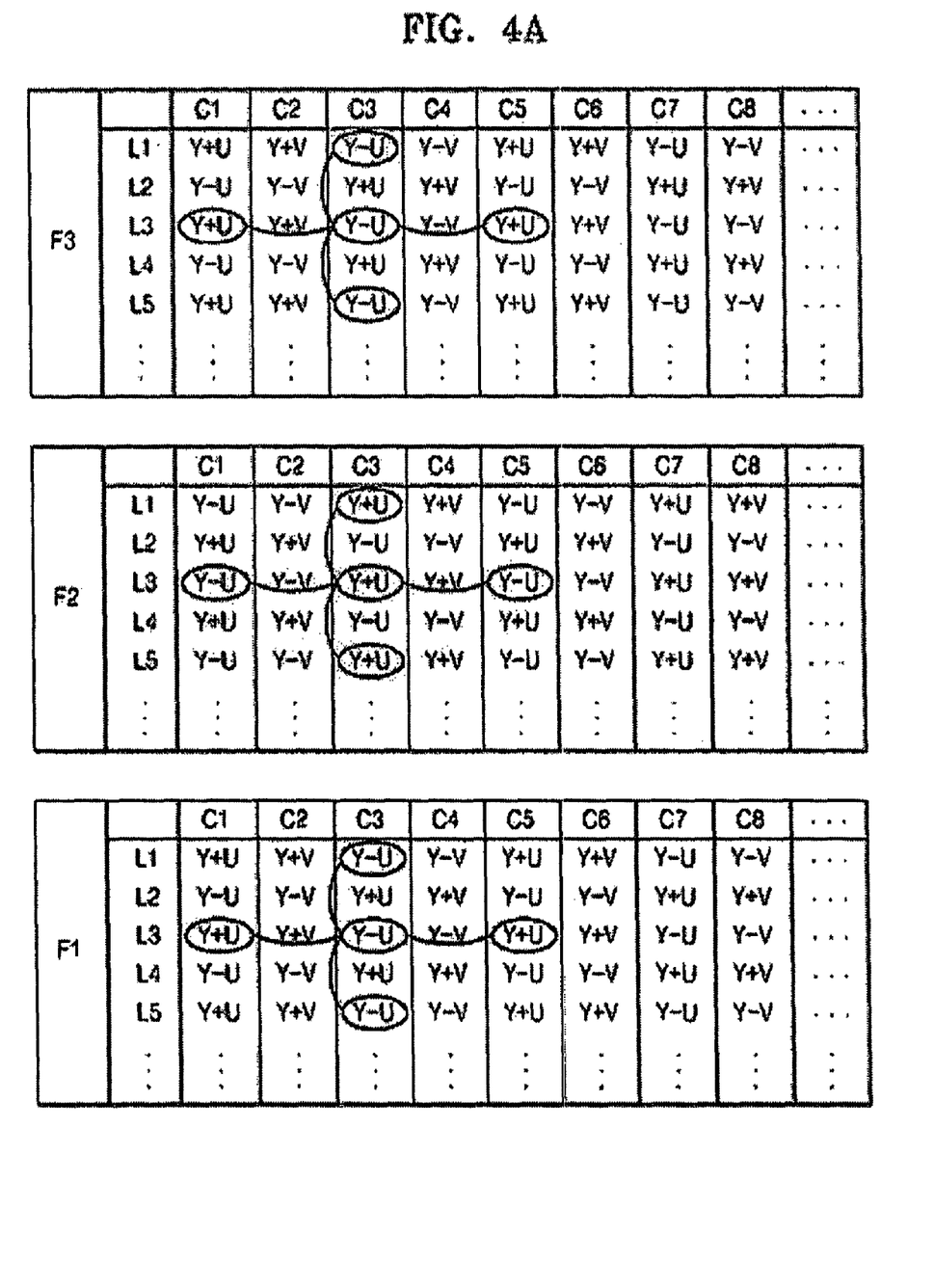
FIGS. 4A and 4B illustrate diagrams for explaining the operation of the color signal Y motion detector of FIG. 2B.
Figure 4B:
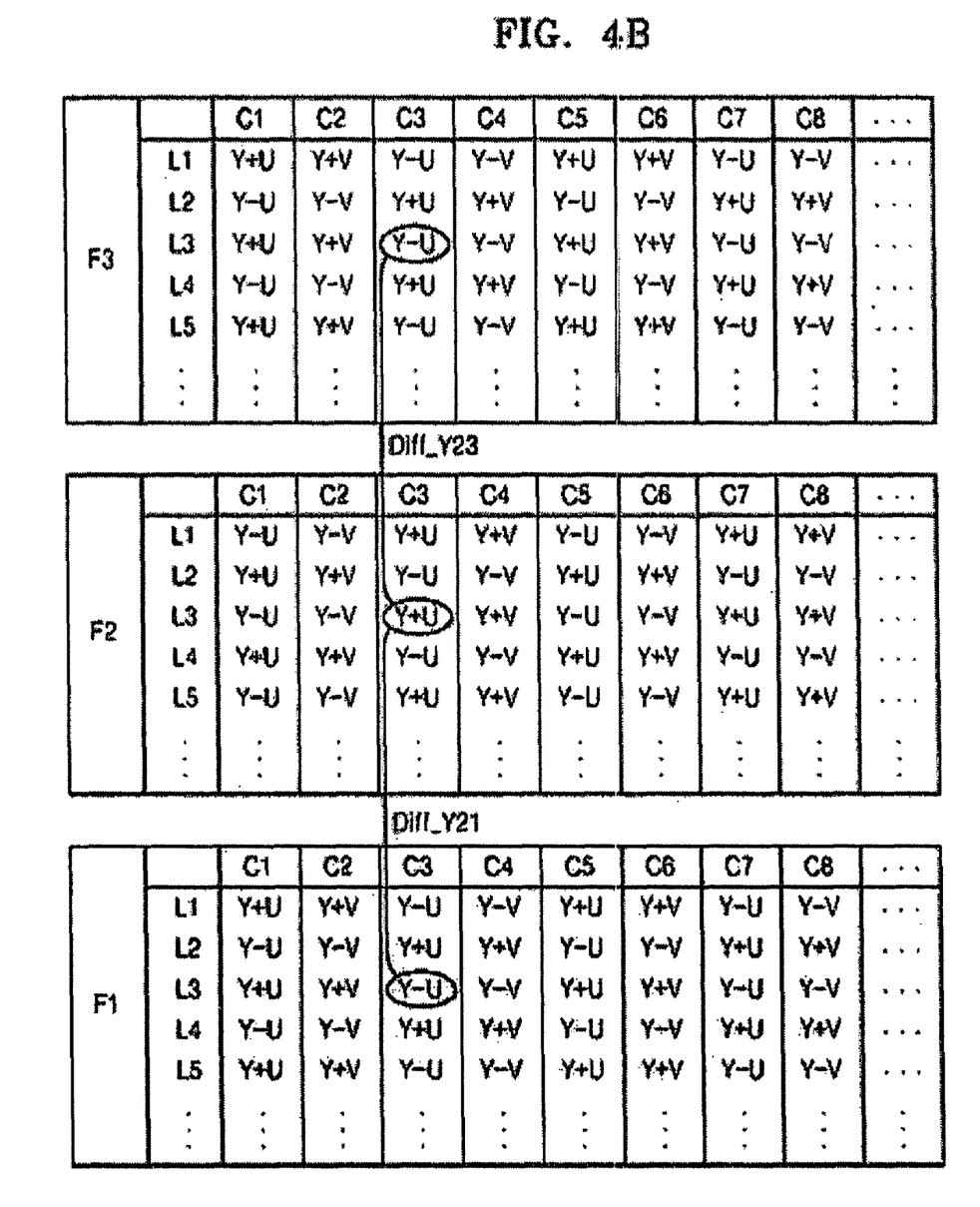

FIG. 2B illustrates a block diagram of the color signal motion detector 304 of FIG. 1 according to an embodiment of the present invention, and FIGS. 4A and 4B are diagrams for explaining the operation of the color signal Y motion detector 304 of FIG. 2B.

Referring to FIGS. 2B, 4A and 4B, the color signal Y motion detector 304 may include a low pass filter 412, which low-pass-filters the first frame signal F1, the second frame signal F2 and the third frame signal F3 to output a first frame Y component signal Y1, a second frame Y component signal Y2 and a third frame Y component signal Y3, a first subtracter 414, which calculates a difference between the second frame Y component signal Y2 and the third frame Y component signal Y3, a second subtracter 416, which calculates a difference between the second frame Y component signal Y2 and the first frame Y component signal Y1, and a comparator 418.

The low pass filter 412 may perform low pass filtering using pixel data of a certain pixel and pixel data of pixels around that pixel, as illustrated in FIG. 4A. For example, as illustrated in a first diagram of FIG. 4A, a Y component signal corresponding to pixel F3/L3/C3 may be extracted using pixel data F3/L1/C3, pixel data F3/L5/C3, pixel data F3/L3/C1, pixel data F3/L3/C5 and pixel data F3/L3/C3.

FIG. 4B illustrates the result of the low pass filtering. The first subtracter 414 may calculate a difference Diff_Y23 between pixel data F2/L3/C3 and the pixel data F3/L3/C3, and the second subtracter 216 may calculate a difference Diff_Y21 between the pixel data F2/L3/C3 and pixel data F1/L3/C3. The comparator 418 may output the Y motion flag MF2 indicating that there is no Y motion in the color image when the difference Diff_Y23 output from the first subtracter 414 is smaller than the Y motion threshold value THR2 and the difference Diff_Y21 output from the second subtracter 416 is smaller than the Y motion threshold value THR2, and otherwise may output the Y motion flag MF2 indicating that there is Y motion in the color image.

Figure 5:
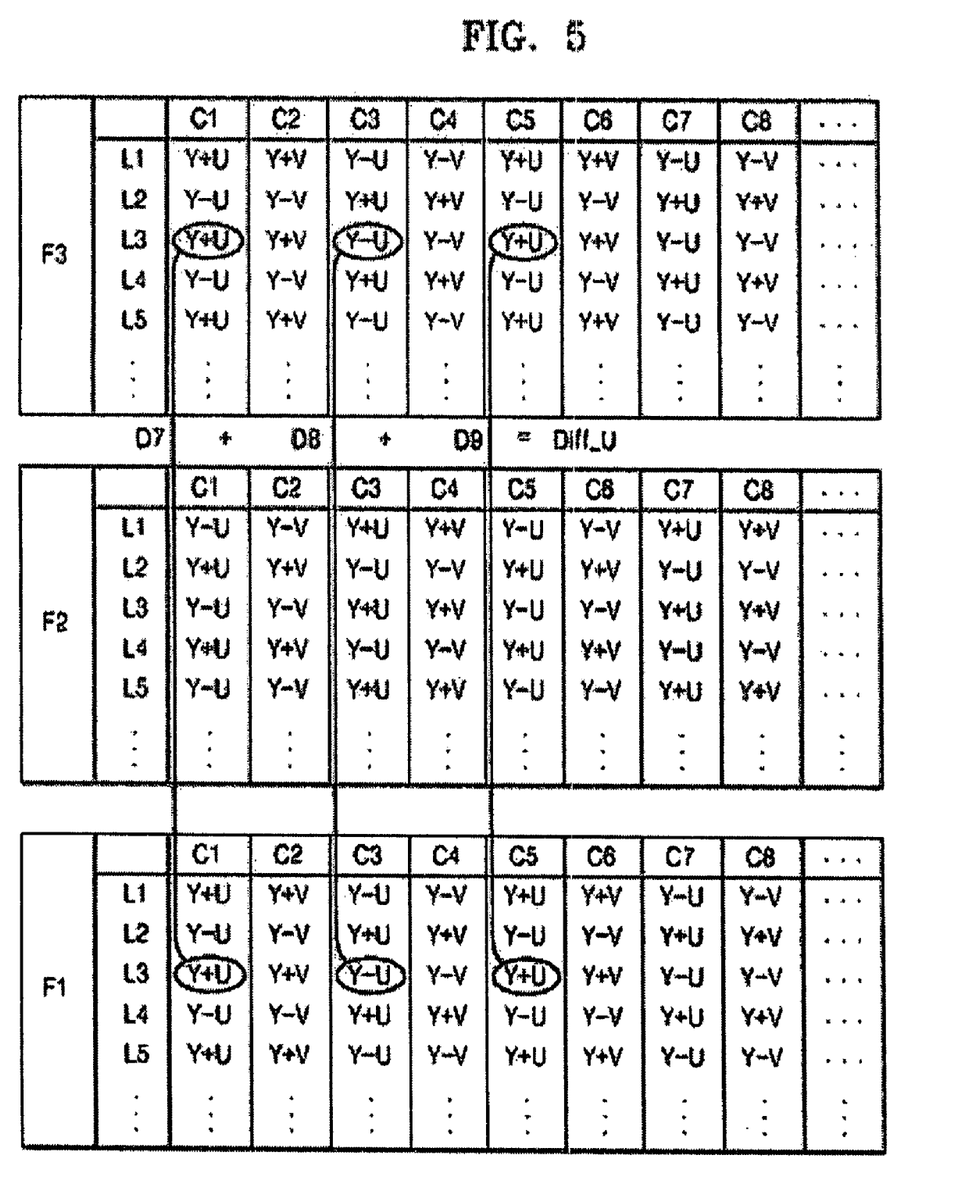
FIG. 5 illustrates a diagram for explaining the operation of the color signal U motion detector of FIG. 2C.

FIG. 2C illustrates a block diagram of the color signal U motion detector 306 of FIG. 1 according to an embodiment of the present invention, and FIG. 5 illustrates a diagram for explaining the operation of the color signal U motion detector 306 of FIG. 2C.

Referring to FIGS. 2C and 5, the color signal U motion detector 306 may include a subtracter 422, which calculates an absolute value of the difference between the third frame signal F3 and the first frame signal F1, an accumulator 424, which accumulates an absolute value of the difference between the third frame signal F3 and the first frame signal F1 for a predetermined unit of data (accumulating absolute values corresponding to three columns in FIG. 5), and a comparator 426.

Specifically, the subtracter 422 may calculate an absolute value D7 of the difference between pixel data F3/L3/C1 and pixel data F1/L3/C1, an absolute value D8 of the difference between pixel data F3/L3/C3 and pixel data F1/L3/C3, and an absolute value D9 of the difference between pixel data F3/L3/C5 and pixel data F1/L3/C5. When the U signal has a phase difference of 180° between adjacent frames, e.g., between the third frame signal F3 and the second frame signal F2 or between the second frame signal F2 and the first frame signal F1, a pixel data difference may be calculated between the third frame signal F3 and the first frame signal F1, which have the same phase. The accumulator 424 may accumulate the absolute values D7, D8 and D9, and may output a U difference value Diff_U.

The comparator 426 may output the U motion flag MF3 indicating that there is no U motion in the color image when the U difference value Diff_U output from the accumulator 424 is smaller than the U motion threshold value THR3, and otherwise may output the U motion flag MF3 indicating that there is U motion in the color image.

Figure 6:
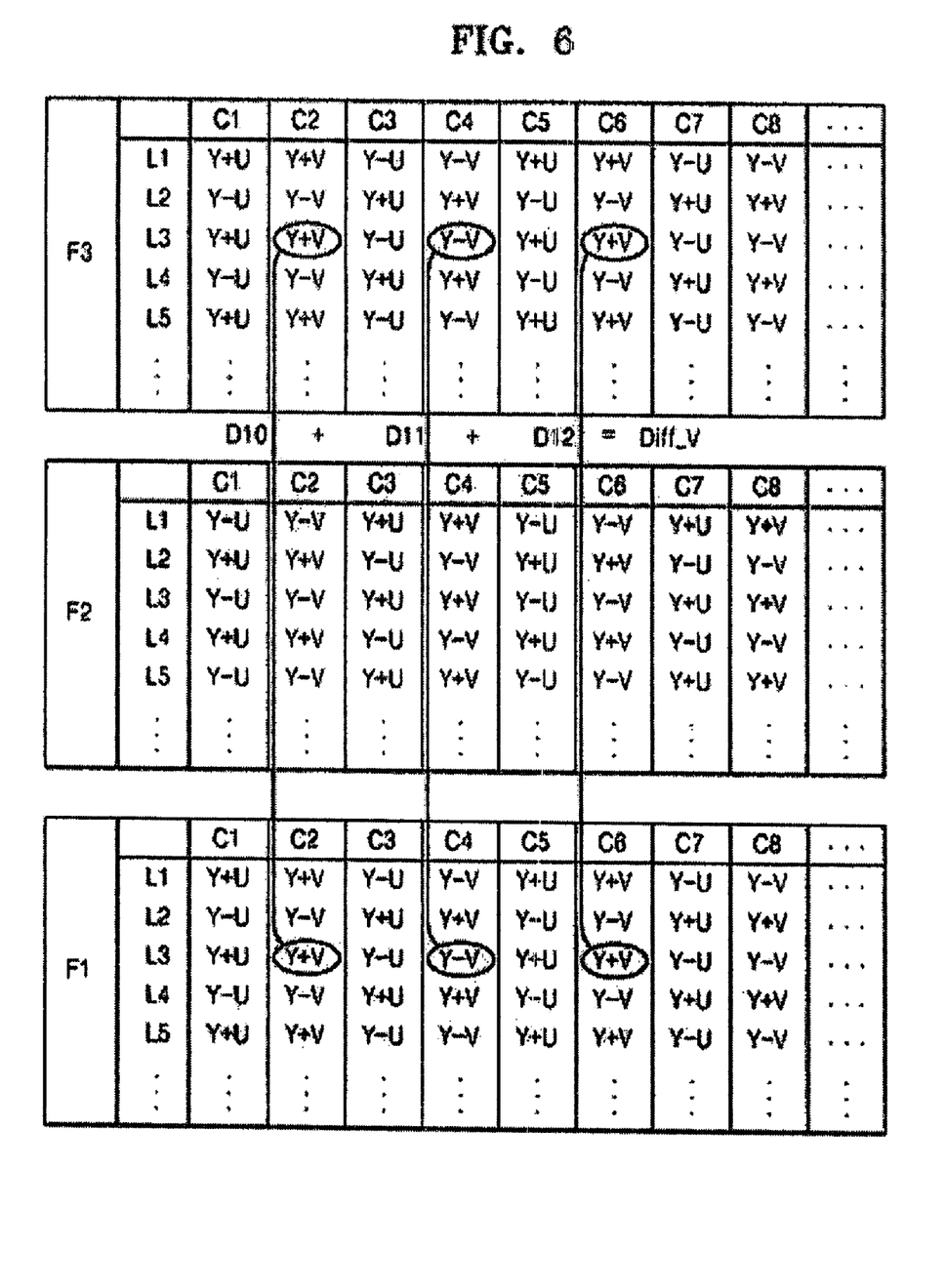
FIG. 6 illustrates a diagram for explaining the operation of the color signal V motion detector of FIG. 2D.

FIG. 2D illustrates a block diagram of the color signal V motion detector 308 of FIG. 1 according to an embodiment of the present invention, and FIG. 6 illustrates a diagram for explaining the operation of the color signal V motion detector 308 of FIG. 2D.

Referring to FIGS. 2D and 6, the color signal V motion detector 308 may include a subtracter 432, which calculates an absolute value of the difference between the third frame signal F3 and the first frame signal F1, an accumulator 434, which accumulates an absolute value of the difference between the third frame signal F3 and the first frame signal F1 for a predetermined unit of data (accumulating absolute values corresponding to three columns in FIG. 6), and a comparator 436.

Specifically, the subtracter 432 may calculate an absolute value D10 of the difference between pixel data F3/L3/C2 and pixel data F1/L3/C2, an absolute value D11 of the difference between pixel data F3/L3/C4 and pixel data F1/L3/C4, and an absolute value D12 of the difference between pixel data F3/L3/C6 and pixel data F1/L3/C6. When the V signal has a phase difference of 180° between adjacent frames, e.g., between the third frame signal F3 and the second frame signal F2 or between the second frame signal F2 and the first frame signal F1, a pixel data difference may be calculated between the third frame signal F3 and the first frame signal F1, which have the same phase. The accumulator 434 may accumulate the absolute values D10, D11 and D12 and outputs a V difference value Diff_V.

The comparator 436 may output the V motion flag MF4 indicating that there is no V motion in the color image when the V difference value Diff_V output from the accumulator 434 is smaller than the V motion threshold value THR4, and otherwise may output the V motion flag MF4 indicating that there is V motion in the color image.

While the present invention has been described with reference to a motion detection apparatus, the present invention can also be embodied as a motion detecting method, which will now be explained. Further, the motion detection of the present invention may be implemented in software, e.g., by an article of manufacture having a machine-accessible medium including data that, when accessed by a machine, cause the machine to detect motion in accordance with methods of the present invention.

The motion detection method according to an embodiment of the present invention may include receiving first, second and third frame signals F1, F2 and F3 to determine whether there is motion in a black-and-white image, receiving the first, second and third frame signals F1, F2 and F3 to determine whether there is Y motion in a color image, receiving the first and third frame signals F1 and F3 to determine whether there is U motion in the color image, and receiving the first and third frame signals F1 and F3 to determine whether there is V motion in the color image.

When it is determined that there is no motion in the black-and-white image or when it is determined that there is no Y motion in the color image, no U motion in the color image and no V motion in the color image, a final motion flag MF indicating that there is no motion in an image may be output.

Then, a black-and-white threshold value THR1 for determining whether there is motion in the black-and-white image, a Y motion threshold value THR2 for determining whether there is Y motion in the color image, a U motion threshold value THR3 for determining whether there is U motion in the color image, and a V motion threshold value THR4 for determining whether there is V motion in the color image may be controlled.

In the motion detection method according to an embodiment of the present invention, when a value (Diff_A of FIG. 3), obtained by accumulating the absolute value of the difference between the second frame signal F2 and the third frame signal F3 for a predetermined unit of data, is smaller than the black-and-white motion threshold value THR1, and when a value (Diff_B of FIG. 3), obtained by accumulating the absolute value of the difference between the second frame signal F2 and the first frame signal F1 for a predetermined unit of data, is smaller than the black-and-white motion threshold value THR1, no motion may be determined to be present in the black-and-white image.

To determine whether there is Y motion in the color image, the first, second and third frame signals F1, F2 and F3 may be low-pass-filtered to obtain a first frame Y component signal (Y1 of FIG. 2B), a second frame Y component signal (Y2 of FIG. 2B) and a third frame Y component signal (Y3 of FIG. 2B). When the difference (Diff_Y23 of FIGS. 2B and 4B) between the second frame Y component signal Y2 and the third frame Y component signal Y3 is smaller than the Y motion threshold value THR2 and the difference (Diff_Y21 of FIGS. 2B and 4B) between the second frame Y component signal Y2 and the first frame Y component signal Y1 is smaller than the Y motion threshold value THR2, no Y motion may be determined to be present in the color image.

Furthermore, when a value (Diff_U of FIGS. 2C and 5), obtained by accumulating the absolute value of the difference between the third frame signal F3 and the first frame signal F1 for a predetermined unit of data, is smaller than the U motion threshold value THR3, no U motion may be determined to be present in the color image. When a value (Diff_V illustrated in FIGS. 2D and 6), obtained by accumulating the absolute value of the difference between the third frame signal F3 and the first frame signal F1 for a predetermined unit of data, is smaller than the V motion threshold value THR4, no V motion may be determined to be present in the color image.

In the motion detection method according to an embodiment of the present invention, the black-and-white motion threshold value THR1 may be set based on a value obtained by accumulating information about whether there has been motion in black-and-white images of a predetermined past frame through to the previous frame. The Y motion threshold value THR2 may be set based on a value obtained by accumulating information about whether there has been Y motion in color images of the predetermined past frame through to the previous frame. The U motion threshold value THR3 may be set based on a value obtained by accumulating information about whether there has been U motion in the color images of the predetermined past frame through to the previous frame. The V motion threshold value THR4 may be set based on a value obtained by accumulating information about whether there has been V motion in the color images of the predetermined past frame through to the previous frame.

As described above, the present invention may output the final motion flag in accordance with whether there is motion in a black-and-white image, whether there is Y motion in a color image, whether there is U motion in the color image, and whether there is V motion in the color image. Accordingly, the present invention may correctly detect whether there is motion in an image. Furthermore, the present invention may control threshold values used to determine whether there is motion in an image in the present frame in response to accumulated information about whether there has been motion in images of a predetermined past frame through to the previous frame. That is, the threshold values may be controlled adaptively according to history about whether there has been motion in an image.

Exemplary embodiments of the present invention have been disclosed herein, and although specific terms are employed, they are used and are to be interpreted in a generic and descriptive sense only and not for purpose of limitation. For example, while Y, U and V signals have been discussed in connection with present invention, any appropriate color signals may be used. Accordingly, it will be understood by those of ordinary skill in the art that various changes in form and details may be made without departing from the spirit and scope of the present invention as set forth in the following claims.

What is claimed is:

1. A motion detection apparatus detecting motion in an image, the motion detection apparatus comprising:
    a processor;
    a black-and-white signal motion detector adapted to receive a first frame signal indicating a previous frame, a second frame signal indicating a present frame, a third frame signal indicating a next frame, and a black-and-white motion threshold value, to determine whether there is motion in a black-and-white image, and to output a black-and-white motion flag;
    a first color signal motion detector adapted to receive the first frame signal, the second frame signal, the third frame signal and a first color motion threshold value, to determine whether there is first color motion in a color image, and to output a first color motion flag;
    a second color signal motion detector adapted to receive the first frame signal, the third frame signal, and a second color motion threshold value, to determine whether there is second color motion in the color image, and to output a second color motion flag; and
    a final motion flag output unit adapted to receive the black-and-white motion flag, the first color motion flag, and the second color motion flag, and to output a final motion flag.

2. The motion detection apparatus as claimed in claim 1, wherein the final motion flag output unit outputs the final motion flag indicating that there is no motion in an image when the black-and-white motion flag indicates that there is no motion in the black-and-white image, or when the first color motion flag indicates that there is no first color motion in the color image and the second color motion flag indicates that there is no second color motion in the color image.

3. The motion detection apparatus as claimed in claim 1, further comprising a threshold value controller adapted to receive the black-and-white motion flag, the first color motion flag, and the second color motion flag, and to control the black-and-white motion threshold value, the first color motion threshold value, and the second color motion threshold value.

4. The motion detection apparatus as claimed in claim 3, wherein the threshold value controller accumulates the values of the black-and-white motion flag, the first color motion flag, and the second color motion flag input to the threshold value controller for a predetermined past frame through to the previous frame, and controls the black-and-white motion threshold value, the first color motion threshold value, and the second color motion threshold value of the present frame in response to the accumulated values.

5. The motion detection apparatus as claimed in claim 4, wherein, when a logic low flag indicates there is no motion, the smaller the accumulated values are, the larger the threshold value controller sets the black-and-white motion threshold value, the first color motion threshold value, and the second color motion threshold value.

6. The motion detection apparatus as claimed in claim 4, wherein, when a logic high flag indicates there is no motion, the larger the accumulated values are, the larger the threshold value controller sets the black-and-white motion threshold value, the first color motion threshold value, and the second color motion threshold value.

7. The motion detection apparatus as claimed in claim 1, wherein the black-and-white signal motion detector comprises:
- a first subtracter adapted to calculate an absolute value of a difference between the second frame signal and the third frame signal;
- a second subtracter adapted to calculate an absolute value of a difference between the second frame signal and the first frame signal;
- a first accumulator adapted to accumulate the absolute value of the difference between the second frame signal and the third frame signal for a predetermined unit of data;
- a second accumulator adapted to accumulate the absolute value of the difference between the second frame signal and the first frame signal for a predetermined unit of data; and
- a comparator adapted to output the black-and-white motion flag indicating that there is no motion in the black-and-white image when a first difference accumulation value output from the first accumulator is smaller than the black-and-white motion threshold value and a second difference accumulation value output from the second accumulator is smaller than the black-and-white motion threshold value.

8. The motion detection apparatus of 1, wherein the first color signal motion detector comprises:
- a low pass filter adapted to low-pass-filter the first frame signal, the second frame signal and the third frame signal, and to output a first frame first color component signal, a second frame first color component signal and a third frame first color component signal;
- a first subtracter adapted to calculate a difference between the second frame first color component signal and the third frame first color component signal;
- a second subtracter adapted to calculate a difference between the second frame first color component signal and the first frame first color component signal; and
- a comparator adapted to output the first color motion flag indicating that there is no first color motion in the color image when a first first color difference value output from the first subtracter is smaller than the first color motion threshold value and a second first color difference value output from the second subtracter is smaller than the first color motion threshold value.

9. The motion detection apparatus as claimed in claim 1, wherein the second color signal motion detector comprises:
- a subtracter adapted to calculate an absolute value of the difference between the third frame signal and the first frame signal;
- an accumulator adapted to accumulate an absolute value of the difference between the third frame signal and the first frame signal for a predetermined unit of data; and
- a comparator adapted to output the second color motion flag indicating that there is no second color motion in the color image when a second color difference value output from the accumulator is smaller than the second color motion threshold value.

10. The motion detection apparatus as claimed in claim 1, further comprising a third color signal motion detector adapted to receive the first frame signal, the third frame signal, and a third color motion threshold value, to determine whether there is third color motion in the color image, and to output a third color motion flag.

11. A motion detection method for determining motion in an image, the method comprising:
- receiving a first frame signal, a second frame signal and a third frame signal, and determining whether there is motion in a black-and-white image;
- receiving the first frame signal, the second frame signal and the third frame signal, and determining whether there is first color motion in a color image;
- receiving the first frame signal and the third frame signal, and determining whether there is second color motion in the color image; and
- outputting a final motion flag in accordance with the black-and-white motion determination, the first color motion determination and the second color motion determination.

12. The motion detection method as claimed in claim 11, wherein outputting the final motion flag includes outputting the final motion flag indicating that there is no motion in the image when it is determined that there is no motion in the black-and-white image, or when it is determined that there is no first color motion in the color image and that there is no second color motion in the color image.

13. The motion detection method as claimed in claim 11, further comprising controlling a black-and-white motion threshold value for determining whether there is motion in the black-and-white image, a first color motion threshold value for determining whether there is first color motion in the color image, and a second color motion threshold value for determining whether there is second color motion in the color image.

14. The motion detection method as claimed in claim 13, further comprising:
- accumulating an first absolute value of a difference between the second frame signal and the third frame signal for a predetermined unit of data;
- accumulating a second absolute value of a difference between the second frame signal and the first frame signal for a predetermined unit of data; and
- determining that there is no motion in the black-and-white image when the accumulated first absolute value and the accumulated second absolute value are smaller than the black-and-white motion threshold value.

15. The motion detection method as claimed in claim 13, further comprising:
- low-pass-filtering the first frame signal, the second frame signal and the third frame signal to obtain a first frame first color component signal, a second frame first color component signal and a third frame first color component signal; and determining that there is no first color motion in the color image when the difference between the second frame first color component signal and the third frame first color component signal is smaller than the first color motion threshold value, and the difference between the second frame first color component signal and the first frame first color component signal is smaller than the first color motion threshold value.

16. The motion detection method as claimed in claim 13, further comprising:

accumulating an absolute value of a difference between the third frame signal and the first frame signal for a predetermined unit of data; and determining that there is no second color motion in the color image when the absolute value is smaller than the second color motion threshold value.

17. The motion detection method as claimed in claim 13, further comprising setting the black-and-white motion threshold value of the present frame in accordance with whether there has been motion in the black-and-white image in a predetermined past frame through to the previous frame.

18. The motion detection method as claimed in claim 13, further comprising setting the first color motion threshold value of the present frame in accordance with whether there has been first color motion in the color image in a predetermined past frame through to the previous frame.

19. The motion detection method as claimed in claim 13, further comprising setting the second color motion threshold value of the present frame in accordance with whether there has been second color motion in the color image in a predetermined past frame through to the previous frame.

20. The motion detection method as claimed in claim 11, further comprising receiving the first frame signal and the third frame signal, and determining whether there is third color motion in the color image.

21. An article of manufacture having a non-transitory machine-accessible medium storing program instruction that, when accessed by a machine, cause the machine to perform a method of determining motion in an image, the method comprising:

receiving a first frame signal, a second frame signal and a third frame signal, and determining whether there is motion in a black-and-white image;

receiving the first frame signal, the second frame signal and the third frame signal, and determining whether there is first color motion in a color image;

receiving the first frame signal and the third frame signal, and determining whether there is second color motion in the color image; and outputting a final motion flag in accordance with the black-and-white motion determination, the first color motion determination and the second color motion determination.

* * * * *